US011852529B2

(12) United States Patent
Margalit et al.

(10) Patent No.: US 11,852,529 B2
(45) Date of Patent: Dec. 26, 2023

(54) SIGNAL COLLECTION SPECTROMETER

(71) Applicant: HUAWEI TECHNOLOGIES CO., LTD., Guangdong (CN)

(72) Inventors: Moti Margalit, Munich (DE); Haim Ben Amram, Munich (DE); Roni El Bahar, Munich (DE); Limor Shahak, Munich (DE); Emir Haleva, Hod Hasharon (IL); Shuki Maman, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/499,894

(22) Filed: Oct. 13, 2021

(65) Prior Publication Data

US 2022/0026271 A1    Jan. 27, 2022

Related U.S. Application Data

(63) Continuation of application No. PCT/EP2019/059761, filed on Apr. 16, 2019.

(51) Int. Cl.
*G01J 3/02* (2006.01)
*G01J 3/28* (2006.01)
(Continued)

(52) U.S. Cl.
CPC ............ *G01J 3/0205* (2013.01); *G01J 3/0272* (2013.01); *G01J 3/2803* (2013.01); *G01J 3/36* (2013.01);
(Continued)

(58) Field of Classification Search
CPC ...... G01J 3/0205; G01J 3/0272; G01J 3/2803; G01J 3/36; G01J 3/44; G01J 2003/1213; G02B 6/4215; G02B 6/4298
See application file for complete search history.

(56) References Cited

U.S. PATENT DOCUMENTS 5,272,518 A  *  12/1993  Vincent ................ G01J 3/51
                                                  250/226
6,648,485 B1    11/2003  Colgan et al.
                (Continued)

FOREIGN PATENT DOCUMENTS

CN    104797911 A    7/2015
CN    106482831 A    3/2017
              (Continued)

OTHER PUBLICATIONS

BioPhotonics, Smartphone Spectroscopy Takes the Lab to the People, Oct. 2018, 13 pages,https://www.photonics.com/Articles/Smartphone_Spectroscopy_Takes_the_Lab_to_the/a63917.
(Continued)

*Primary Examiner* — Abdullahi Nur
(74) *Attorney, Agent, or Firm* — HUAWEI TECHNOLOGIES CO., LTD.

(57) ABSTRACT

A spectrometer for studying a sample comprises a light guide for receiving light from the sample. The received light is emitted by the light guide through an exit surface that is on a side of the light guide and extending in a longitudinal direction of the light guide. The light emitted through the exit surface is filtered by a linear variable filter having an array of bandpass filters extending alongside and adjacent the exit surface. The filtered light is detected by the photodetectors of a detector array disposed parallel to the linear variable filter, and signals of the photodetectors are analyzed to obtain a spectral distribution of the light from the sample.

19 Claims, 4 Drawing Sheets

(51) Int. Cl.
*G01J 3/36* (2006.01)
*G01J 3/44* (2006.01)
*G02B 6/42* (2006.01)
*G01J 3/12* (2006.01)

(52) U.S. Cl.
CPC .............. *G01J 3/44* (2013.01); *G02B 6/4215* (2013.01); *G02B 6/4298* (2013.01); *G01J 2003/1213* (2013.01)

(56) References Cited

U.S. PATENT DOCUMENTS

| | | | |
|---|---|---|---|
| 6,785,002 | B2 | 8/2004 | Zarrabian et al. |
| 7,420,663 | B2 | 9/2008 | Wang et al. |
| 8,284,401 | B2 | 10/2012 | Choi et al. |
| 2002/0131047 | A1 | 9/2002 | Zarrabian et al. |
| 2002/0163641 | A1* | 11/2002 | Shroder .................. G01J 3/26 356/419 |
| 2005/0200278 | A1 | 9/2005 | Jones et al. |
| 2011/0221998 | A1 | 9/2011 | Adachi et al. |
| 2012/0206726 | A1 | 8/2012 | Pervez et al. |
| 2014/0131578 | A1 | 5/2014 | Hruska et al. |
| 2014/0247442 | A1 | 9/2014 | Johnson et al. |
| 2014/0347660 | A1* | 11/2014 | Rayer .................. G01B 11/306 356/300 |
| 2015/0185139 | A1* | 7/2015 | Kiesel .................... G01N 21/27 356/402 |
| 2015/0247795 | A1 | 9/2015 | Hruska et al. |
| 2016/0232828 | A1 | 8/2016 | Jia et al. |
| 2016/0265974 | A1 | 9/2016 | Ertel et al. |
| 2022/0026271 | A1* | 1/2022 | Margalit .................. G01J 3/36 |

FOREIGN PATENT DOCUMENTS

| | | |
|---|---|---|
| CN | 107250744 A | 10/2017 |
| CN | 107407598 A | 11/2017 |

OTHER PUBLICATIONS

Andrew J.S. McGonigle et al, https://www.mdpi.com/1424-8220/18/1/223, Smartphone Spectrometers, 2018, 15 pages.
Giovanni Rateni et al, Smartphone-Based Food Diagnostic Technologies: A Review, 2017, https://www.mdpi.com/1424-8220/17/6/1453/htm, 22 pages.

* cited by examiner

FIG. 2
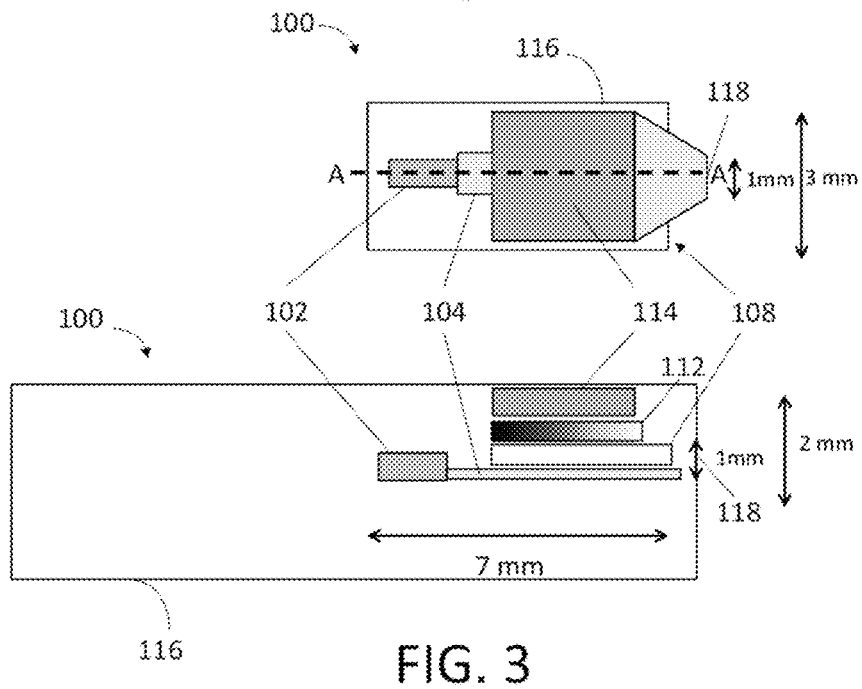
FIG. 3
Fig. 4A
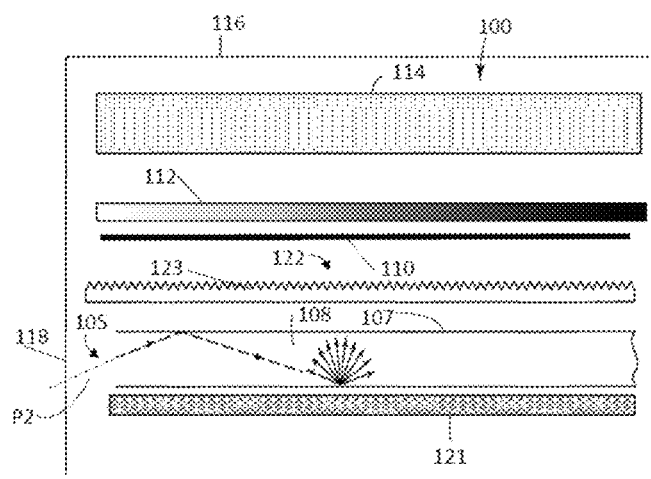

FIG. 4B
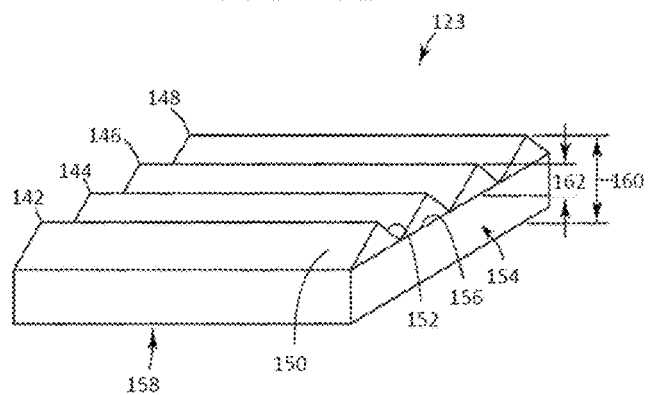
FIG. 5
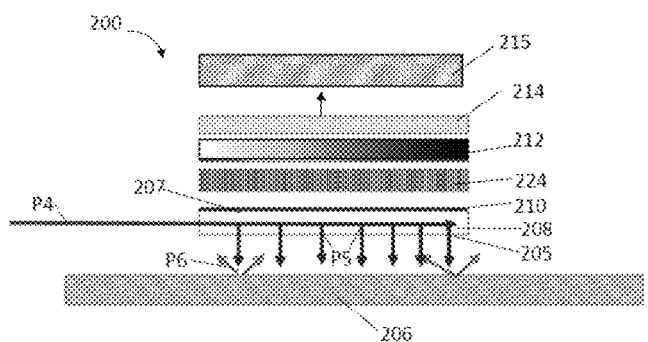
FIG. 6
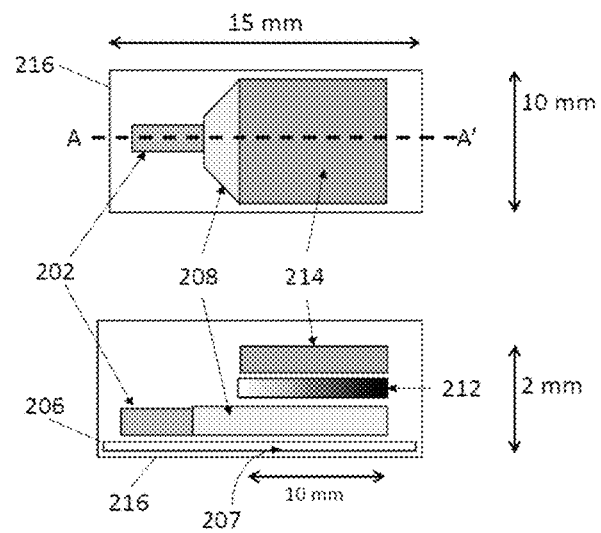
FIG. 7

SIGNAL COLLECTION SPECTROMETER

CROSS-REFERENCE TO RELATED APPLICATIONS

This application is a continuation of International Application PCT/EP2019/059761, filed on Apr. 16, 2019, the disclosure of which is hereby incorporated by reference in its entirety.

TECHNICAL FIELD

The present invention relates to a spectrometer, and, more specifically, to a compact spectrometer and a method to measure frequency components of light.

BACKGROUND

A spectrometer is a device for measuring spectral components of electromagnetic radiation, such as light. For example, a spectrometer can be used to measure the intensity of light reflected from or transmitted through a sample, at one or more wavelengths. The measured spectral distribution of the light that interacts with the sample is then correlated to a property of the sample, such that the property of the sample may be determined. A spectrometer may be used to characterize the emission spectrum of a photoluminescent material or the Raman scattering pattern of materials.

Standard spectrometers are constrained to certain minimum size requirements due to physical constraints. A standard spectroscopic system includes a source of light; a dispersive element (such as a diffraction grating) for separating the light or energy into its spectral components, a photodetector; and an optical photon path between the dispersive element and the photodetector. Gratings have an advantage in that a wide range of dispersion levels is made available by adjusting the grating pitch. However, because the gratings disperse the light as a function of angle, they intrinsically require a fairly complex geometry and a relatively large footprint to allow dispersion of light across a detector. Grating-based spectrometers are thus impractical for applications where compactness, ruggedness, and low cost are desired.

To separate the light to its spectral components, filters are a more compact alternative to diffraction gratings. Common examples of filters are bandpass filters, long-pass filters, and short-pass filters. A linear variable filter has optical properties that change spectrally as a function of position on the physical surface of the filter. Linear variable filters may be manufactured by varying the filter's many thin-film layer thicknesses along the length of the filter's surface. As the layer thicknesses increase, the filter's spectral characteristics shift to longer wavelengths.

In addition, standard spectroscopic systems that are packaged in a casing typically require two openings (holes) to be made in the device casing. One drilling provides an aperture for directing light from a light source onto a sample, and a second drilling provides an aperture for receiving light from the sample to the photodetector. This design model is impractical for inclusion in mobile devices, in which manufacturers aim to decrease the number of apertures in a casing.

Another obstacle in minimization is the inefficient collection of light from the sample. In spectrometers with dispersive elements, all photons must enter the device in a parallel direction, to assure high resolution. This parallel direction is achieved by a narrow slit, typically tens of microns in width, to limit the directionality of the entering photons. In practice, this slit lowers the total amount of photons that enter a device, and thus the intensity of a signal. The higher the resolution, the lower the light intensity becomes. As a result, signal intensity is lower.

SUMMARY

There thus is a need for a compact spectrometer that can efficiently deliver a light from a sample to an optical detector, with minimal losses in intensity. In addition, there is a need for a compact spectrometer that can measure light in a plurality of wavelengths with high resolution. In addition, there exists a need for a compact spectrometer that can be incorporated in a casing with a single aperture therethrough.

It is an object of the present invention to provide a compact spectrometer that is capable of analyzing optical inputs at a high resolution with a minimum volume requirement. It is another object of the present invention to provide a compact spectrometer that is capable of delivering to an optical detector a high percentage of the light that is introduced therein, so as to provide a strong spectroscopic signal. It is another object of the present invention to provide a compact spectrometer that is incorporated in a casing with only a single aperture therethrough. It is another object of the present invention to provide a compact spectrometer that is incorporated in a mobile electronic device such as a smartphone.

The foregoing and other objects are achieved by the features of the independent claims. Further implementation forms are apparent from the dependent claims, the description and the figures.

According to a first aspect, a spectrometer for measuring a plurality of optical spectral components reflected or emitted from a sample is disclosed. The spectrometer includes a light guide having an entrance surface and an exit surface. The light guide is configured to admit light from the light source via the entrance surface and dispense the admitted light via the exit surface. A spatially dependent optical filter is arranged adjacent to the exit surface and configured to filter the dispensed light. A plurality of photodetectors is arranged adjacent to the spatially dependent optical filter and configured to receive the filtered light. Advantageously, the light guide directs light from the entrance surface to the exit surface, and the photodetectors receive the filtered light, thereby enabling analysis of the filtered light. Another advantage of the invention is that the greater surface area of the exit surface compared to the entrance surface allows the light to be spread out, thus enabling more precise filtering of the light by the spatially dependent optical filter. Another advantage of the invention is that the different components of the spectrometer may be configured compactly.

In an implementation of the spectrometer according to the first aspect, processing circuitry is connected to the plurality of photodetectors and is configured to obtain spectral information. The spectral information comprises information about absolute or relative intensities of frequency components of the received light based on photodetection signals from the plurality of photodetectors. Advantageously, the processing circuitry enables analysis of the light transmitted through the spectrometer.

In another possible implementation of the spectrometer according to the first aspect, obtaining the spectral information comprises integration of the photodetection signals. Advantageously, the integration of the photodetection signals permits analysis of an entire spectrum of wavelengths of frequency components of light from the sample.

In another possible implementation of the spectrometer according to the first aspect, obtaining the spectral information comprises deconvolution of the photodetection signals. Advantageously, deconvolution enables reversal of optical distortion that may occur in an imaging instrument.

In another possible implementation of the spectrometer according to the first aspect, the frequency components include four or more frequency components. Advantageously, the spectrometer may thus be used to analyze a light source that emits more than four frequency components.

In another possible implementation of the spectrometer according to the first aspect, the frequency components include frequency components having wavelengths separated by fewer than 20 nanometers. Advantageously, the spectrometer may be used to distinguish frequency components of wavelengths similar to each other.

In another possible embodiment of the spectrometer according to the first aspect, the light guide is configured to dispense the admitted light in directions on the exit surface that deviate by not more than 10 degrees from a mean direction of the dispensed light. Advantageously, dispensing the light at a minimum angle ensures that the outputted light will be intense enough to be detectable by the photodetectors. In addition, dispensing the light at a minimum angle ensures that the outputted light will be filtered correctly by the blocking filter and linear variable filter, because layer filtration has a dependency on incident angle.

In another possible implementation of the spectrometer, the exit surface defines a greater surface area than the entrance surface. An advantage is that the greater surface area of the exit surface compared to the entrance surface allows the light to be spread out, thus enabling more precise filtering of the light by the spatially dependent optical filter.

In another possible implementation of the spectrometer according to the first aspect, the exit surface is perpendicular to the entrance surface. Advantageously, this configuration allows the spectrometer to be configured compactly.

In another possible implementation of the spectrometer according to the first aspect, a light control element is configured to pass a first subset of frequency components emitted from the exit surface and back reflect a second subset of frequency components into the exit surface. A light recycling element is configured to redirect the second subset of frequency components back to the exit surface with a modified set of frequency components. Advantageously, reflection of light by the action of the light control element and light recycling element causes a high percentage of the light entering the light guide to pass through the exit surface at a narrow angle, thereby increasing the ability of the photodetectors to detect the light.

In another possible implementation of the spectrometer according to the first aspect, an optical blocking filter is configured between the light control element and the photodetectors. Advantageously, the optical blocking filter may selectively transmit light in a particular range of wavelengths while absorbing the remainder. The optical blocking filter may filter certain ranges of light, such as elastically reflected light in a Raman spectroscopy system.

In another possible implementation of the spectrometer according to the first aspect, the light control element is a brightness enhancing film. Advantageously, the brightness enhancing film permits light to pass through the light control element at an angular range of up to 30 degrees. The brightness enhancing film controls the angle of light exiting the output facet, such that virtually all the light entering the input facet is transmitted to the image sensor, thereby enabling measurement with a high intensity signal.

In another possible implementation of the spectrometer according to the first aspect, the light guide, light control element, light recycling element, spatially dependent optical filter, and image sensor are arranged parallel to each other. Advantageously, the parallel arrangement enables the spectrometer to be constructed compactly.

In another possible implementation of the spectrometer according to the first aspect, the light guide, light control element, light recycling element, spatially dependent optical filter, and photodetectors are arranged parallel to each other. Advantageously, the parallel arrangement enables the spectrometer to be constructed compactly.

In another possible implementation of the spectrometer according to the first aspect, surface, and the spectrometer further comprises a second light guide configured to transmit light from the light source to the sample. Advantageously, including the second light guide within the spectrometer allows for a compact construction of the spectrometer.

Optionally, the light guide, light control element, optical filter, and image sensor are arranged within a casing. The second light guide is arranged parallel to and adjacent to the light guide within the casing. The casing comprises an aperture that is configured to both transmit light from the second light guide onto the sample, and to receive optical spectral components reflected from the sample into the light guide. Advantageously, this arrangement allows a single aperture in the casing to serve both as a conduit of light to the sample and a conduit of light from the sample to the image sensor. As another advantage, the spectrometer can thereby be included in a mobile device such as a smartphone, with only a single aperture in the case of the smartphone.

In another possible implementation of the spectrometer according to the first aspect, the spectrometer is configured within a smartphone or tablet device. Advantageously, the spectrometer is thus configured in a portable electronic device, allowing for greater flexibility in use of the spectrometer.

In another possible implementation of the spectrometer according to the first aspect, the spectrometer is at least one of a Raman spectrometer, a fluorescence spectrometer, and an absorption spectrometer. Advantageously, use of the spectrometer for these spectroscopy methods provides various practical applications of the spectrometer.

In a second aspect of the invention, a method of measuring a plurality of frequency components of light from a light source comprises inputting the light into a light guide having an entrance surface and an exit surface; dispensing the admitted light via the exit surface; filtering the dispensed light with a spatially dependent optical filter arranged adjacent to the exit surface; and receiving the filtered light with a plurality of photodetectors arranged adjacent to the specially dependent optical filter.

One advantage of the invention is that the different components of the spectrometer may be configured compactly. Another advantage of the invention is that the light guide directs light from the entrance surface to the exit surface, and the photodetectors receive the filtered light, thereby enabling analysis of the filtered light.

In an implementation of the method according to the second aspect, the method further comprises obtaining spectral information about absolute or relative intensities of frequency components of the received light based on photodetection signals from the plurality of photodetectors.

Advantageously, the detecting can be used to identify characteristics of the frequency components of a sample.

In an implementation of the method according to the second aspect, the method further comprises dispensing the admitted light in directions on the exit surface that deviate by not more than 10 degrees from a mean direction of the dispensed light. Advantageously, dispensing the light at a minimum angle ensures that the outputted light will be intense enough to be detectable by the photodetectors. In addition, dispensing the light at a minimum angle ensures that the outputted light will be filtered correctly by the blocking filter and linear variable filter, because layer filtration has a dependency on incident angle.

In an implementation of the method according to the second aspect, the method further comprises dispensing the admitted light in a perpendicular direction relative to the direction of the inputted light. Advantageously, this configuration allows the spectrometer to be configured compactly.

In a further implementation of the method according to the second aspect, the method further comprises transmitting a first subset of frequency components emitted from the exit surface through a light control element; back reflecting with the light control element a second subset of optical spatial frequencies into the exit surface; and redirecting with a light recycling element the second subset of optical spatial frequencies back to the exit surface with a modified set of optical spatial frequencies. Advantageously, reflection of light by the action of the light control element and light recycling element causes a high percentage of the light entering the light guide to pass through the exit surface at a narrow angle, thereby increasing the ability of the photodetectors to detect the light.

Optionally, the light recycling element is a brightness enhancing film. Advantageously, the brightness enhancing film permits light to pass through the light control element at an angular range of up to 30 degrees. The brightness enhancing film controls the angle of light exiting the output facet, such that virtually all the light entering the input facet is transmitted to the image sensor, thereby enabling measurement with a high intensity signal.

In a further implementation of the method according to the second aspect, the method further comprises transmitting light through a second light guide onto a sample; and reflecting light from or transmitting light through the sample and into the entrance surface. Advantageously, including a second light guide within the spectrometer for transmitting the light from the light source allows for a compact construction of the spectrometer.

In a further implementation of the method according to the second aspect, the spectrometer is at least one of a Raman spectrometer, a fluorescence spectrometer, and an absorption spectrometer. Advantageously, use of the spectrometer for these spectroscopy methods provides various practical applications of the spectrometer.

One advantage of the disclosed embodiments is that they disclose a compact spectrometer that is capable of analyzing optical inputs at a high throughput with a minimum space requirement. Another advantage of the disclosed embodiments is that they disclose a compact spectrometer that is capable of delivering to an optical detector a high percentage of the light that is introduced therein, so as to provide a strong signal scan. Another advantage of the disclosed embodiments is that they permit detecting of multiple spectral components entering the spectrometer at high resolution. Another advantage of some disclosed embodiments is that they disclose a compact spectrometer that may incorporated in a casing with only a single aperture therethrough. Another advantage of some disclosed embodiments is that they disclose a compact spectrometer that may be incorporated in a mobile electronic device such as a smartphone.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a schematic top view of the spectrometer of FIG. 1, according to some embodiments of the invention;

FIG. 3 is a schematic view of a cross-section of the spectrometer of FIG. 1, taken at the A-A axis of FIG. 2, according to some embodiments of the invention;

FIGS. 4A and 4B depict a brightness enhancing film suitable for use with the spectrometer of FIG. 1, according to some embodiments of the invention;

FIG. 5 is a schematic view of a second embodiment of a spectrometer and sample, according to some embodiments of the invention;

FIG. 6 is a schematic top view of the spectrometer of FIG. 6, according to some embodiments of the invention;

FIG. 7 is a schematic view of a cross-section of the spectrometer of FIG. 6, taken at the A-A axis of FIG. 6, according to some embodiments of the invention.

DESCRIPTION OF EMBODIMENTS

Figure 1:
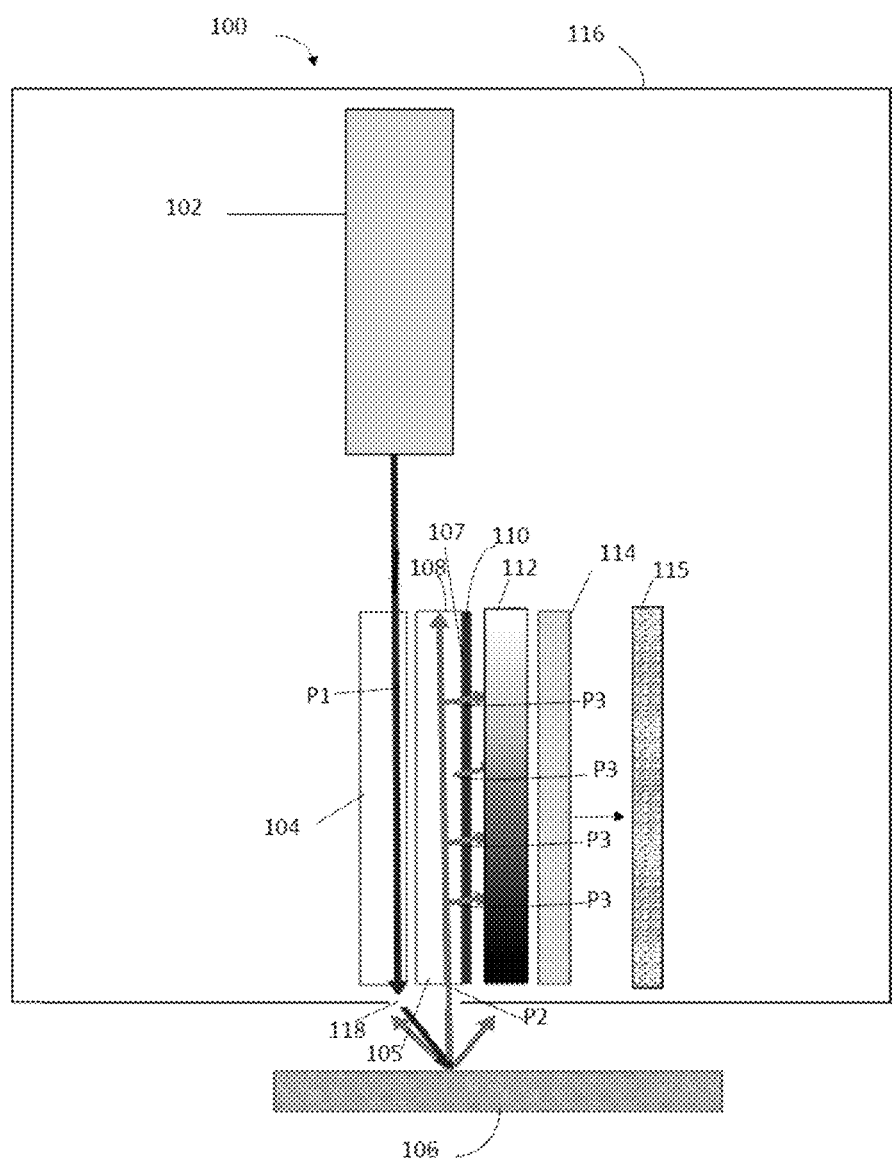
FIG. 1 is a schematic view of a spectrometer and sample, according to some embodiments of the invention.

The present invention, in some embodiments thereof, relates to a spectrometer, and, more to a spectrometer, and, more specifically, but not exclusively, to a compact spectrometer that measures at high resolution, with high utilization of incoming light, and can be integrated into a mobile device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIGS. 1-3, spectrometer 100 is arranged within casing 116. Spectrometer 100 includes light source 102. Light source 102 may be, for example, a laser, LED, blackbody radiation source, ionization based light source, sunlight, or an external light source. In one embodiment, the light source 102 is a laser commonly used for Raman spectroscopy, for example, a laser at 532 nm, 638 nm, 785 nm, or 1064 nm. These wavelengths are just examples, and a laser with any wavelength can be selected, such as any wavelength in the infra-red, visible, or ultraviolet spectra.

Light source 102 is depicted in FIG. 1 as within casing 116. In other embodiments, light source 102 may be outside casing 116, or in a different orientation within casing 116.

Light is transmitted from light source 102, along path P1, and through source light guide 104 to aperture 118. Source light guide 104 may also be referred to in this disclosure as a "second light guide." As used in the present disclosure, a light guide is a waveguide that is suitable for optical transmission. Waveguides used for optical transmission are typically dielectric waveguides, in which a dielectric material with high permittivity, and thus high index of refraction, is surrounded by a material with lower permittivity. The light guide may be made of glass, quartz or various types of transparent polymers such as polycarbonate, polymethyl methacrylate (PMMA), or silicone. The light guide guides optical waves by total internal reflection.

Advantageously, by directing the light from the light source 102 through light guide 104, spectrometer 100 can be designed more compactly than if the light source 102 were immediately adjacent to aperture 118. This is because light guide 104 may be thinner than light source 102.

Upon exiting source light guide 104, light passes through aperture 118 in the casing 116, and illuminates sample 106. The sample may be a liquid, gas, or solid, and may be contained in any suitable structure for holding the sample in place relative to the light source, for example a cuvette. At least a portion of the light reflects off of the sample 106, reenters the casing 116, and enters reflectance light guide 108 through entrance surface 105 along path P2. Reflectance light guide 108 may also be referred to in this disclosure as the "light guide" or the "first light guide."

As depicted in FIG. 1, reflectance light guide 108 is arranged within the casing 116 adjacent and parallel to source light guide 104. Reflectance light guide 108 may be arranged in any other orientation relative to source light guide 104. In addition, instead of light being reflected off of sample 106, light may be transmitted through sample 106, e.g., from a light source located on an opposite side of sample 106 from reflectance light guide 108. In addition, in some embodiments, the spectrometer 100 need not be used with a sample at all—in such embodiments, the spectrometer 100 is used to analyze spectral components of the environment, such as sunlight or artificial light in a room. In such embodiments, the spectrometer may be used for white balancing a camera.

After light enters reflectance light guide 108, it is constrained to certain paths within reflection light guide 108 by the principles of total internal reflection. Total internal reflection is a phenomenon which occurs when a propagated wave strikes a medium boundary at an angle larger than a particular critical angle with respect to the normal to the surface. If the refractive index is lower on the other side of the boundary and the incident angle is greater than the critical angle, the wave cannot pass through and is entirely reflected. The critical angle is the angle of incidence above which the total internal reflection occurs.

At least a portion of the light entering light guide 108 escapes the light guide 108 through an exit surface 107 of the light guide 108 and into light path P3. In the depicted embodiment, exit surface 107 has a greater surface area than entrance surface 105. In the depicted embodiment, light path P3 is substantially perpendicular to light path P2. The light guide 108 may be configured to guide the light along this light path based solely on the principles of total internal reflection. As will be described further herein, additional elements may be situated alongside light guide 108 to increase the percentage of the light that exits light guide 108 at a substantially perpendicular angle.

Blocking filter 110 is arranged alongside light guide 108 in path P3 of light exiting the light guide. The blocking filter 110 may be used to block the non-modified excitation light source from passing through. For example, in cases of Raman or fluorescence spectroscopy, light source 102 may be a laser. The resulting spectrum, after being reflected off of the sample, may be within a range of ±5 nm from the initial wavelength of the laser. In such situations, blocking filter 110 may be a high-pass filter passing all wavelengths +5 nm from the laser line and blocking all others. Additionally or alternatively, the blocking filter 110 may be a bandpass filter passing all wavelengths ±5 nm from the laser line and blocking all others. The blocking filter may have an optical density of OD6 or more—that is, for the blocked-out wavelengths, the transmitted light is 6 orders of magnitude (10e-6) or less than to the incident light.

The light that passes through the blocking filter 110 next passes through linear variable filter 112. Linear variable filter 112 may also be referred to as a spatially dependent variable filter. Linear variable filter 112 is an array of bandpass filters. The bandwidth of each bandpass filter can be, for example, 5 nm, 10 nm, 15 nm, or 20 nm. The individual bandpass filters can be overlapping. The bandpass filters cover a range of frequency components for the light, for example, 100 nm or 200 nm. In one embodiment, 100 bandpass filters, each with a bandwidth of 5 nm, cover a range of 200 nm.

In one embodiment, the spectrometer 100 is used in Raman spectroscopy with an excitation light source 102 of a laser at 532 nm. The linear variable filter 112 is configured to permit passage of frequency components with wavelengths of 550 to 650 nm. In another embodiment, the spectrometer 100 is used in Raman spectroscopy with an excitation light source 102 of a laser at 785 nm. The linear variable filter is configured to permit passage of frequency components with wavelengths from 800 to 1000 nm.

In the depicted embodiment, the surface area of the exit surface of the light guide 108 is larger than the surface area of the entrance to light guide 108. Advantageously, this configuration allows inclusion of a greater surface area for the linear variable filter.

Photodetectors 114 detect the intensity of light passing through each of the bandpass filters in the linear variable filter 112. The photodetectors may incorporate any photodetection material that is known to those of skill in the art or may become known, such as photoelectric materials, semiconductors, photochemicals, photorefractive materials, graphene, or silicon.

Optionally, photodetectors 114 comprise one or more back-illuminated sensors. Advantageously, in such embodiments, a higher percentage of incoming light may be captured by the photodetectors.

The size and configuration of the photodetectors 114 may be customized according to the desired resolution of the spectrometer 100. As is known to those of skill in the art, resolution of spectrometer 100 is a function of various factors, including the dynamic range of the spectrometer 100 (i.e., the range of intensities that can be measured by the spectrometer 100), the minimum detectable light sample required to be detected, the desired spectral resolution (i.e., ability to distinguish between different frequency components of different wavelengths), and the bandwidth of each the photodetectors 114. The dynamic range and the minimum detectable light sample determine the required pixel size, while the spectral resolution and bandwidth determine the number of pixels required. As used herein, each unit of a photodetection material is referred to as a pixel. For embodiments that require higher resolving ability or an ability to measure light at higher dynamic ranges, the size of the pixels and the number of pixels may be correspondingly increase.

The photodetectors 114 are connected to one or more processors 115 with processing circuitry that analyzes the measured intensities and determines, based on the measured intensities, spectral information about the sample 106. The spectral information comprises information about absolute or relative intensities of optical spatial frequencies of the received light based on photodetection signals from the plurality of photodetectors 114. The optical spatial frequencies may also be referred to as frequency components. The processing circuitry may comprise hardware and software. The hardware may comprise analog or digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors 115 and a non-volatile memory connected to the one or more processors 115. The non-volatile memory may carry executable program code with, when executed by the one or more processors 115, causes the spectrometer 100 to perform the operations or methods described herein.

In some embodiments, obtaining the spectral information comprises integration of the photodetection signals. For example, the photodetection signals received by each of the bandpass filters in the linear variable filter 112 can be integrated into a single spectral analysis.

In some embodiments, the light admitted into the photodetectors 114 is not dispensed evenly over the exit surface of reflectance waveguide 108. For example, there can be an intensity drop of 50% at some positions relative to the peak intensity. The processors 115 can be configured to detect and compensate for this intensity variation when obtaining the spectral information.

In some embodiments, obtaining the spectral information comprises deconvolution of the photodetection signals with the processors 115. In optics and imaging, deconvolution refers to the process of reversing optical distortion that takes place in an imaging instrument, thus creating clearer images. The deconvolution may be done digitally by the processors 115. The processors can be configured to perform the deconvolution using any algorithm known to those of skill in the art, such as the Van Cittert algorithm, or any algorithm for calculating a point spread function.

The detected frequency components may include four, five, six, seven, or even more frequency components. The frequency components may be separated by fewer than 50 nanometers, fewer than 20 nanometers, or by an even smaller difference in wavelengths. In this respect, the spectrometer 100 has distinct advantages over an RGB image sensor, which typically is configured to resolve only three spectral components—red, green, and blue—which are separated by more than 50 nanometers.

As depicted in FIGS. 2 and 3, spectrometer 100 is designed to be configured compactly. In one exemplary embodiment, the spectrometer 100 occupies a space of 7 mm long by 3 mm wide by 2 mm deep. Aperture 118 occupies 1 mm of the 3 mm width. The photodetectors may have a depth of about 500 microns. These dimensions are provided for exemplification only, and are not intended to be limiting in any way. In particular, the length of the spectrometer 100 may be adjusted as needed based on the size requirements of the pixels, as discussed above.

The light guides 104, 108, blocking filter 110, linear variable filter 112, and photodetectors 114 may be affixed within casing 116 using any mechanism known to those of skill in the art, including but not limited to adhesives. Optionally, the light guides 104, 108, blocking filter 110, and linear variable filter 112 are affixed together without any air gap therebetween, and the photodetectors 114 are configured separately within the casing 116. Various components, such as blocking filter 110 and linear variable filter 112 may be manufactured with injection-molded plastic, which, advantageously, may be relatively inexpensive.

Figure 8A:
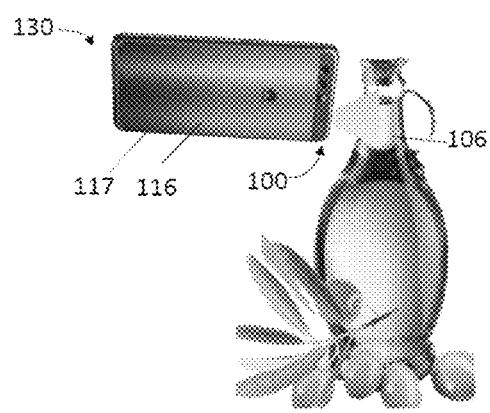
FIGS. 8A and 8B depict systems incorporating the spectrometers of FIG. 1 and FIG. 5, respectively, into a mobile phone, according to some embodiments of the invention.

Casing 116 may be larger than the spectrometer itself and may include other devices within the casing 116. In one embodiment, as depicted in FIG. 8A, the casing 116 may be part of a mobile phone 130. The aperture 118 may be an aperture that is typically configured within mobile phone 130, such as an aperture for a camera or for a flash.

Turning now to FIGS. 4A and 4B, the spectrometer 100 may additionally comprise light recycling element 121 and light control element 122. Light recycling element 121 and light control element 122 operate together to limit the range of angles at which light exits the light guide 108, and thereby increase the intensity of the light that is emitted onto the photodetector.

Light control element 122 is depicted in FIG. 4B as a brightness enhancement film 123, similar to those used in liquid crystal displays. Brightness enhancement film 123 collimates light emitted from the light guide 108, thereby increasing the brightness and resolution of the light passing to the blocking filter 110. The increased brightness enables the pixels of photodetectors 114 to detect a higher percentage of the light entering the light guide 108. Advantageously, the increased brightness also enhances resolution of the photodetectors 114 and therefore enables the pixels to occupy a relatively smaller size.

Brightness enhancement film 123 includes an array of prisms typified by prisms 142, 144, 146, 148, as illustrated in FIG. 4B. Each prism, for example prism 142, has a first facet 150 and a second facet 152. The prisms 142, 144, 146, 148 can be formed on a body portion 154 that has a first surface 156 on which the prisms are formed and a second surface 158 that is substantially flat or planar and opposite the first surface.

Optionally, the prisms are regular right prisms. By right prisms, it is meant that the apex angle is approximately 90 0°, but can also range from approximately 70 0° to 120 0° or from approximately 80 0° to approximately 100 0°. The prism facets need not be identical, and the prisms may be tilted with respect to each other. Furthermore, the relationship between the thickness 160 of the film and the height 162 of the prisms is not critical, but it is desirable to use thinner films with well-defined prism facets.

The light control element 122 can also comprise other collimating devices instead of or in addition to brightness enhancing film 123, such as microlenses, apertures, or light pipes (not shown in FIG. 4A). Brightness enhancing films 123 that are currently known permit light to exit therethrough only within a viewing cone (i.e., a set of angles relative to a mean direction of the dispensed light) of approximately 30-350°. To generate a narrower viewing cone, such as a viewing cone of approximately 100°, it is necessary to incorporate one or more of the other collimating devices into light control element 122.

As is known to those of skill in the art, the angle at which frequency components of light are permitted to pass through bandpass filter determines the wavelengths of light that the filter permits through. Accordingly, the collimating devices that are used in light control element 122 may be selected in order to correlate with desired bandwidths for the bandpass filters of linear variable filter 112.

In operation of light control element 122, light directed at light control element 122 at an angle greater than the angle of the viewing cone is reflected back into the light guide 108. For example, if the distribution of the light relative to the mean, without any light control element, is from −60° to +60°, then after the effect of the light control element 122, the distribution of the light relative to the mean is −20° to +20°. The light that would have been emitted between the angles of −60° to −20° and +20° to +60° is instead reflected back to the waveguide 108. This reflected light may also be referred to in this disclosure as a first subset of the frequency components emitted from the exit surface 107 of the light guide 108.

Spectrometer 100 may also include light recycling element 121. Light recycling element 121 is included in the spectrometer 100 in order to redirect light through the light control element 122 toward the photodetectors 114. Light recycling element 121 comprises a highly reflective layer, such as an aluminum layer or a multi-layer dielectric coating, that is adhered to one or more facets of light guide 108. In the schematic depiction of FIG. 4A, light recycling element 121 is oriented at an opposite facet of light guide 108 relative to the light control element 122. However, light recycling element 121 can be oriented at any facet of the light guide 108, except for the input surface (opposite aperture 118) or the output surface (opposite blocking filter 110, linear variable filter 112, and photodetectors 114). Light recycling element 121 may be arranged parallel to light guide 108 or may be angled relative to light guide 108.

Light recycling element 121 redirects backreflected light, that had reentered light guide 108 from light control element 122, back toward the light control element 122 at a modified angle. By way of illustration, suppose that light guide 108 has a critical angle of 300°, and that light control element 122 permits passage of light within ±100° from the mean. Thus, the light control element backreflects all incident light between ±100° and ±300° back into to light guide 108. Without light recycling element 121, a significant portion of the backreflected light could exit the light guide 108 in a direction other than that of the exit surface. The light recycling element 121 redirects the backreflected light towards the light guide 108 at a modified angle. At least a portion of the redirected light is within the angle of ±100° and thus may pass through the light control element 122. The redirected light may also be referred to in this disclosure as a second subset of frequency components. This second subset of frequency components is redirected back to the exit surface 107 with a modified set of frequency components. The process may be repeated until substantially all light entering light guide 108 passes through light control element 122.

FIGS. 5-7 depict a second embodiment of a spectrometer 200. Spectrometer 200 contains many of the same elements as spectrometer 100, and accordingly like elements are numbered similarly, except that the reference numerals begin with "2" instead of "1."

In spectrometer 200, a light beam enters light guide 208 along path P4 from a light source 202 (not shown in FIG. 5). Light exits light guide 208 in a uniform manner along path P5, which is substantially perpendicular to path P4, and is directed onto sample 206. At least a portion of the light reflects off of sample 206 or is scattered by sample 206 and is transmitted along path P6 back through entrance surface 205 into light guide 208. Path P6 is substantially opposite in direction to path P5. The reflected light then proceeds through exit surface 207 to blocking filter 210, linear variable filter 212, and photodetectors 214, and analyzed by processors 215, in the manner described in connection with spectrometer 100. Optionally, aperture array 224 is used to perform spatial filtering and enhance resolution.

One significant difference of the spectrometer 200 compared to the spectrometer 100 is that the same light guide is used for both transmitting light onto the sample 206 from source 202, and for guiding light from sample 206 toward linear variable filter 212 and blocking filter 214. Advantageously, the use of only one light guide as opposed to two allows spectrometer 200 to be constructed compactly.

In one exemplary embodiment, and as illustrated in FIGS. 6 and 7, spectrometer 200 is within a casing 216 having dimensions of 15 mm long by 10 mm wide by 2 mm deep. The sample 206 is evaluated over a length of 10 mm. The length at which the sample 206 is evaluated need not be the entire length of light guide 208. Thus, even in the embodiment of FIGS. 6 and 7, exit surface 207 may define a surface area greater than that of entrance surface 205.

Figure 8B:
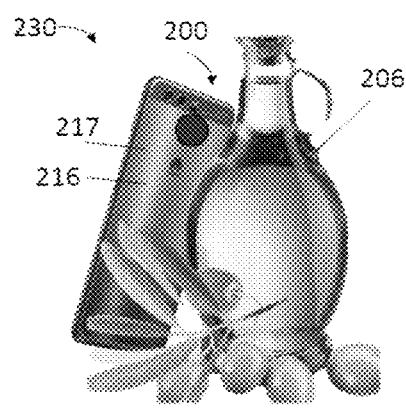

FIGS. 8A and 8B depict spectrometers 100, 200, within mobile phones 130, 230. The casing 117, 217 of each of the mobile phones also serves as the casing 116, 216 of the spectrometers 100, 200. For illustration, spectrometer 100 is shown in the orientation of FIG. 8A and spectrometer 200 in the orientation of FIG. 8B; however, each of the spectrometers 100, 200 may be arranged at different locations within mobile phone 130, 230. The spectrometers 100, 200 may also be integrated into other portable electronic devices, such as a tablet or a smart watch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant light guides, blocking filters, light control elements, linear variable filters, optical detectors, and computing devices and processors, will be developed and the scope of the terms light guides, blocking filters, light control elements, linear variable filters, optical detectors, and computing devices and processors computing devices, and processors is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A spectrometer for measuring frequency components of light from a sample, comprising:
    a light guide for receiving light from the sample, wherein the light guide has an entrance surface disposed at a longitudinal end of the light guide for the light from the sample to enter the light guide, and a side exit surface for the light to exit the light guide, the light guide has a longitudinal direction, and the side exit surface extends on a side of the light guide along the longitudinal direction and has a surface normal perpendicular to the longitudinal direction of the light guide;
    a linear variable filter disposed alongside the light guide and adjacent to the side exit surface of the light guide, wherein linear variable filter has a longitudinal direction parallel to the longitudinal direction of the light guide, the light exiting the light guide through the side exit surface passes through the linear variable filter and is filtered by the linear variable filter, the linear variable filter comprises an array of bandpass filters having different filtering wavelength bands that depend on positions of the bandpass filters in the linear variable filter;
    a detector array comprising a plurality of photodetectors, the detector array being disposed adjacent to the linear variable filter to receive the light passing through and filtered by the linear variable filter.

2. The spectrometer of claim 1, further comprising processing circuitry connected to the detector array to receive signals from the plurality of photodetectors, wherein the processing circuitry is configured to obtain spectral information regarding the light from the sample from the signals received from the photodetectors.

3. The spectrometer of claim 1, wherein the bandpass filters in the linear variable filter have a bandwidth of 5 nm, 10 nm, 15 nm, or 20 nm.

4. The spectrometer of claim 1, wherein a bandwidth of the bandpass filters in the linear variable filter is narrower than 20 nanometers.

5. The spectrometer of claim 1, wherein the light guide is structured to emit light through the side exit surface in directions that deviate by no more than 10 degrees from a normal direction of the side exit surface.

6. The spectrometer of claim 1, wherein the entrance surface is perpendicular to the side exit surface.

7. The spectrometer of claim 1, further comprising a blocking filter disposed between the side exit surface of the light guide and the linear variable filter for blocking light of a selected range of wavelengths.

8. The spectrometer of claim 1, further comprising:
    a light control element disposed between the side exit surface of the light guide and the linear variable filter for collimating light emitted from the side exit surface towards the detector array; and a light recycling element arranged on a facet of the light guide to reflect light toward the side exit surface.

9. The spectrometer of claim 8, wherein the light control element is a brightness enhancing film comprising an array of prisms.

10. The spectrometer of claim 8, wherein the light control element, light recycling element, linear variable filter, and detector array extend parallel to the light guide in the longitudinal direction.

11. The spectrometer of claim 10, further comprising a light source and a second light guide positioned to transmit testing light from the light source to the sample.

12. The spectrometer of claim 11, further comprising a casing, wherein the light guide, light control element, linear variable filter, and detector array are arranged within the casing, the second light guide is arranged parallel to the light guide within the casing, and the casing comprises an aperture disposed to both transmit the testing light from the second light guide onto the sample, and to receive the light from the sample into the light guide.

13. A method of measuring frequency components of light from a sample, comprising:
receiving light from the sample by means of a light guide, wherein the light from the sample enters the light guide through an entrance surface of the light guide disposed at a longitudinal end of the light guide;
emitting the light received from the sample through a side exit surface of the light guide, wherein the light guide has a longitudinal direction, and the side exit surface extends on a side of the light guide along the longitudinal direction and has a surface normal perpendicular to the longitudinal direction;
filtering the light emitted through the side exit surface of the light guide using a linear variable filter disposed alongside and adjacent to the side exit surface, wherein the linear variable filter has a longitudinal direction parallel to the longitudinal direction of the light guide and comprises an array of bandpass filters having different filtering frequency bands that depend on positions of the bandpass filters in the linear variable filter; and
detecting the light filtered by the linear variable filter using a detector array having a plurality of photodetectors extending parallel and adjacent to the linear variable filter.

14. The method of claim 13, further comprising:
sending signals generated by the photodetectors of the detector array to control circuitry;
obtaining spectral information of the light received from the sample by using the control circuitry to analyze the signals generated by the photodetectors.

15. The method of claim 13, wherein the light guide is structured to emit light through the side exit surface in directions that deviate by no more than 10 degrees from a normal direction of the side exit surface.

16. The method of claim 13, wherein the entrance surface of the light guide is perpendicular to the side exit surface of the light such that the light guide receives the light from the sample in a direction perpendicular to a direction in which the light guide emits the light through the side exit surface.

17. The method of claim 13, further comprising:
collimating the light emitted through the side exit surface of the light guide towards the detector array; and
reflecting, by means of a light recycling element disposed on a facet of the light guide, light towards the side exit surface.

18. The method of claim 17, wherein the collimating is by means of a brightness enhancement film comprising an array of prisms.

19. The method of claim 13, further comprising:
transmitting testing light from a light source through a second light guide onto the sample to generate the light from the sample.

* * * * *